US005925852A

United States Patent [19]

Hinz et al.

[11] Patent Number: 5,925,852

[45] Date of Patent: Jul. 20, 1999

[54] LEAD WIRE FEED-THROUGH DEVICE

[75] Inventors: Joseph P. Hinz, North Mankato; Jeffrey A. Hudson, Mankato, both of Minn.

[73] Assignee: Caterpillar Inc., Peoria, Ill.

[21] Appl. No.: 09/132,525

[22] Filed: Aug. 11, 1998

[51] Int. Cl.[6] .......... H02G 3/18

[52] U.S. Cl. .......... 174/65 R; 29/869; 174/74 R

[58] Field of Search .......... 29/596, 605, 732, 29/736, 860, 868, 869, 872, 870, 871; 174/74 R, 93, 92, 60, 65 R, 65 G; 439/78, 82, 875

[56] References Cited

U.S. PATENT DOCUMENTS

| | | | |
|---|---|---|---|
| 3,675,300 | 7/1972 | Reust et al. | 29/205 |
| 3,850,501 | 11/1974 | Butterfield et al. | 339/263 R |
| 3,875,325 | 4/1975 | Anderson et al. | 174/92 |
| 4,032,214 | 6/1977 | McNerney | 339/218 M |
| 4,110,550 | 8/1978 | Di Pietro | 174/19 |
| 4,273,953 | 6/1981 | Guzy | 174/84 R |
| 4,484,022 | 11/1984 | Eilentropp | 174/84 R |
| 4,530,551 | 7/1985 | Benasutti | 339/17 C |
| 4,610,737 | 9/1986 | Bacon et al. | 156/49 |
| 4,634,213 | 1/1987 | Larsson et al. | 339/275 T |
| 4,654,473 | 3/1987 | Roux et al. | 174/84 R |
| 4,952,256 | 8/1990 | Schauer et al. | 156/49 |
| 5,065,503 | 11/1991 | Luciana et al. | 29/735 |
| 5,233,751 | 8/1993 | Luciani et al. | 29/736 |
| 5,245,748 | 9/1993 | Luciana et al. | 29/735 |
| 5,315,065 | 5/1994 | O'Donovan | 174/84 C |
| 5,361,487 | 11/1994 | Luciani et al. | 29/596 |
| 5,392,506 | 2/1995 | Luciani et al. | 29/596 |
| 5,422,438 | 6/1995 | Lamome | 174/84 C |

*Primary Examiner*—Lee W. Young
*Assistant Examiner*—Bobby Rushing, Jr.
*Attorney, Agent, or Firm*—Alan J. Hickman; Moore & Hansen

[57] ABSTRACT

A structure for making a sealed electrical connection through a barrier is disclosed. The structure comprises a feed-through board that is sealed in an aperture in the barrier. A conductive rod is disposed within a bore formed in the board. Inner and outer conductors are electrically connected to the conductive rod by means of connecting structures formed in the respective ends thereof. A plurality of layers of insulative materials are formed about the inner and outer conductors and the conductive rod so as to electrically insulate the conductors and the conductive rod, to form a structurally sound point of connection through the barrier, and to seal the bore through which the conductive rod is passed. A method for making a sealed electrical connection through a barrier is also disclosed.

20 Claims, 5 Drawing Sheets

LEAD WIRE FEED-THROUGH DEVICE

TECHNICAL FIELD

The present invention relates to a structure for making electrical connections through a barrier. More specifically, the present invention relates to a lead wire feed-through apparatus for electrically connecting a plurality of lead wires from a generator core through a wall of a generator housing in a manner which provides adequate electrical insulation and which minimizes stresses applied to the lead wires.

In the fabrication of rotating electrical equipment such as generators and motors, and other electrical equipment such as transformers and the like, it is necessary to provide a means for electrically connecting a plurality of leads emanating from respective core windings within the generator to the current regulating devices or electric transmission lines associated therewith. One highly desirable method of manufacturing magnetic cores for use in generators involves the steps of forming a predetermined number of coils from magnet wire, discrete groups of the coils being electrically connected to a predetermined number of lead wires; wrapping the formed coils in an insulative material; assembling the coils into a stator structure; immersing the stator structure in an epoxy resin and performing a vacuum pressure impregnation procedure upon the stator structure to ensure the removal of all moisture and air bubbles therefrom; and, curing the epoxy impregnated stator structure in an oven to cure the resins in the insulative materials wound around the coils to create a stator assembly having a high mechanical strength as well as a high degree of resistance to chemicals and moisture.

A problem with this desirable method of manufacturing stator assemblies is that the insulation on the lead wires connected to the respective coils may become relatively brittle due to the combination of the epoxy resin and the heat of the curing cycle. Where the insulation of the lead wires becomes brittle, the incidence of failures which occur during fabrication and during use of the generators increases. Therefor, it is an object of the invention to provide a lead wire feed-through device which reduces the rate of failures in the lead wires which occur during the fabrication and use of the generators due to embrittlement. The lead wire feed-through device solves the problem of embrittlement by providing a structure which eliminates the exposure of the outer lead wires to the vacuum pressure impregnation process and which also minimizes the amount of manipulation of the lead wires during the fabrication of the generator.

DISCLOSURE OF THE INVENTION

The present invention is for an apparatus for making an electrical connection between a first conductor and a second conductor through a barrier. The apparatus is generally described as a lead wire feed-through device and comprises a feed-through board that is sealingly mounted in an aperture in the barrier. The feed-through board has a bore formed therethrough in which is disposed a conductive rod. The ends of the conductive rod have first and second connecting structures formed therein, respectively. The first conductor is located entirely on the inner side of the barrier and is coupled to the conductive rod by means of the first connecting structure. The second conductor is located entirely on the outer side of the barrier and is coupled to the conductive rod by means of the second connecting structure. Finally, a plurality of insulating layers are formed about the first and second conductors and the conductive rod, with at least a portion of the plurality of insulating layers extending through the bore in the feed-through board to seal the bore.

Each of the connecting structures of the conductive rod are comprised of a longitudinal bore that is formed into the respective ends of the conductive rod. The longitudinal bores are sized to receive a predetermined length of a conducting core of the conductors. In addition, each longitudinal bore has associated therewith a respective solder aperture formed through the side wall of the conductive rod. The solder apertures are in communication with the respective longitudinal bores of the conductive rod. The conducting cores of the first and second conductors are retained in the respective longitudinal bores in the conductive rod by a quantity of solder introduced into the respective solder apertures. The use of a solder to retain the conductors of the lead wires within the longitudinal bores has the added benefit of improving the electrical connection between the respective conductors and the conductive rod.

In order to electrically isolate the first and second conductor and the conductive rod from the chassis of the stator, a plurality of layers of insulative materials are wrapped about inner and outer sides of the lead wire feed-through device. Wrapped about the juncture between the first connecting structure and the conducting core of the first conductor is a layer of insulative felt. An insulative fiber tape is wrapped about the insulating material of the first conductor, the insulative felt, and a portion of the conductive rod. The insulative fiber tape extends through the bore in the feed-through board so as to substantially seal the bore in the feed-through board. It is preferred that at least 10 layers of the insulative fiber tape be wrapped about the first conductor, the insulative felt, and the conductive rod. However, the minimum number of layers of the insulative fiber tape varies depending upon the magnitude of the voltage that will be conducted through the lead wire feed through device. It is also preferred that the insulative fiber tape be comprised of mica. An insulative mastic is wrapped about the electrical connection on the outer side of the feed-through board from before the juncture between the second connecting structure and the conducting core of the second conductor over the fiber tape to the feed-through board, creating a watertight seal around the bore. An insulative sheet is wrapped around the insulative mastic so as to entirely cover the insulative mastic. Finally, a sleeve is applied over the outer side of the lead wire feed-through device so as to entirely cover the insulative sheet. The sleeve extends from the outer side of the feed-through board to the insulating material of the second conductor.

Alternatively, the insulative mastic and the sheet of insulative material may be replaced with a continuous layer of insulative tape that extends from the outer side of the feed-through board to the insulating material of the second conductor. A sleeve is applied over the insulative tape as described above.

The sheet of insulative material is formed into a tapered trapezoid having a narrow end and a wide end and is preferably of a silicone insulating material. The narrow end of the sheet is wrapped around the outer side of the feed-through device at the juncture between the conductive rod and the second conductor such that with each successive turn of the sheet around the first conductor, the sheet is wrapped longitudinally farther along the conductive rod and the insulating material of the first conductor than on the previous turn.

To seat the conductive rod within the bore in the feed-through board, it is preferred to cut the feed-through board into two sections. The sections are divided by a cut that intersects the bore formed in the feed-through board. The conductive rod having the first and second conductors coupled thereto is captured in the bore between the two sections as the sections are brought together.

However, it may be desirable for the feed-through board to comprise a plurality of bores rather than a single bore. Where this is the case, the feed-through board will comprise a plurality of sections with each of the sections being defined by a plurality of cuts that intersect the plurality of bores formed in the feed-through board. The conductive rods having respective first and second conductors coupled thereto are captured in the bores between the sections as the sections are brought together as described above in conjunction with the embodiment of the feed-through board having only a single bore.

A method for making an electrical connection between a first conductor and a second conductor through a barrier having an inner side and an outer side with the first and second conductors comprising a conducting core surrounded by an insulating material entails a number of steps, the first of which is to connect the first conductor to a first end of a conductive rod. Next, a juncture between the first conductor and the first end of the conductive rod is wrapped in a first insulative material that is preferably an insulative felt. A second insulative material, such as an insulative fiber tape, is then wrapped around a portion of the insulating material of the first conductor and a portion of the conductive rod and over the first insulative material as well. The wrapped conductive rod is next secured in a bore in a feed-through board and the first and second insulative materials are impregnated with an epoxy resin which is cured.

Once the epoxy resin has been cured, the second conductor is connected to the second end of a conductive rod and the outer side of the feed-through device is wrapped in a third insulative material which is typically an insulative mastic material. A fourth insulative material, which is generally a trapezoidal sheet of insulative material that is preferably fashioned of silicone, is wrapped around the outer side of the feed-through device and completely over the third insulative material. And finally, a sleeve is secured over the outer side of the lead wire feed-through device. The sleeve extends from the outer side of the feed-through board to the insulating material of the second conductor to completely cover the third and fourth insulative materials and to seal the outer side of the lead wire feed-through device from contaminants.

BEST MODE FOR CARRYING OUT THE INVENTION

Figure 1:
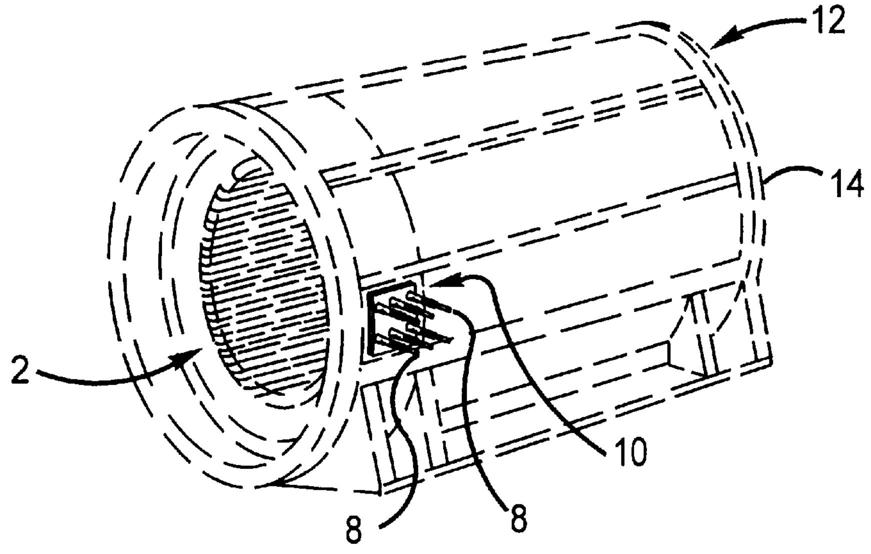
FIG. 1 is a perspective view of a stator assembly illustrating the lead wire feed-through device of the present invention extending from the wall of the stator assembly.
Figure 1A:
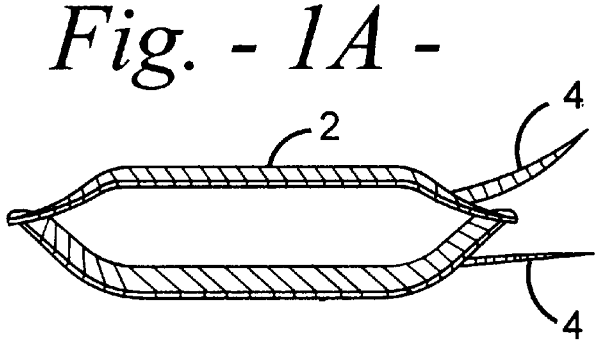
FIG. 1A is a perspective view of a coil of magnet wire prior to installation in a stator assembly.

Referring first to FIG. 1A, a typical generator coil 2 having coil leads 4 electrically connected thereto is illustrated. FIG. 1 depicts a plurality of coils 2 mounted within a core 13 that is mounted within a stator frame 14 to form a stator 12. In operation, a rotor (not shown) is arranged to rotate within the core 13, thereby inducing an electrical current in the coils 2. The electrical current flowing within coils 2 is tapped by means of coil leads 4. Typically, the coils 2 of a stator 12 are grouped such that the electrical current flowing through a group of coils may be gathered independent of the remaining groups of coils. Coils 2 are grouped by forming an electrically conductive lead connect (not shown) between the respective coil leads 4 and the inner lead wires 6 to permit an electrical current to flow therethrough.

The electrical currents flowing through the coils 2, and subsequently through inner lead wires 6, are conducted to the exterior of the stator frame 14 by means of a lead wire feed-through device 10. FIG. 1 illustrates a feed-through device 10 having a plurality of outer lead wires 8 connected thereto.

In its simplest form, a feed-through device 10 permits an electrical connection to be made through a barrier, in this case the stator frame 14, while preventing air, water, or other substances from passing through the barrier or, as in the present case, the stator frame 14. By providing a sealed electrical connection, a feed-through device 10 prevents the premature failure of a generator due to contamination of the rotor or stator. It should be understood that the feed-through device 10 of the present invention is applicable to other electrical devices such as transformers and electrical rotating equipment such as an electric motor.

Figure 2:
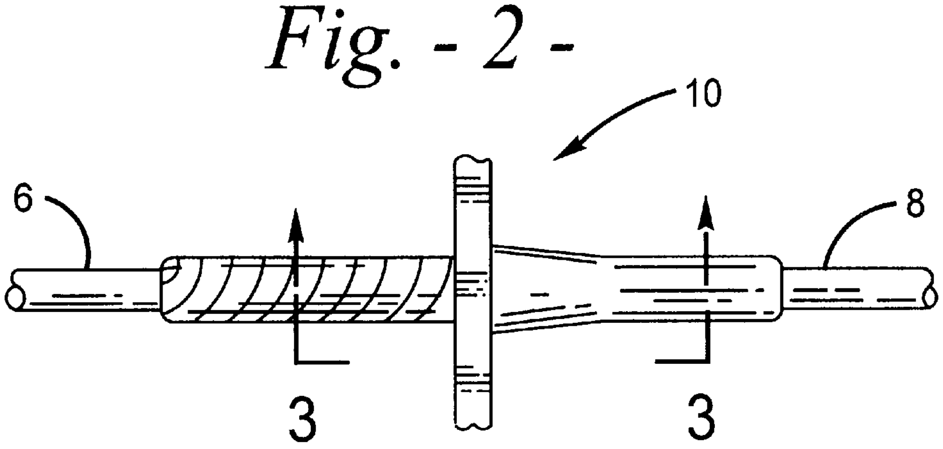
FIG. 2 is a fragmentary plan view of the lead wire feed-through device showing the exterior configuration of the invention.
Figure 3:
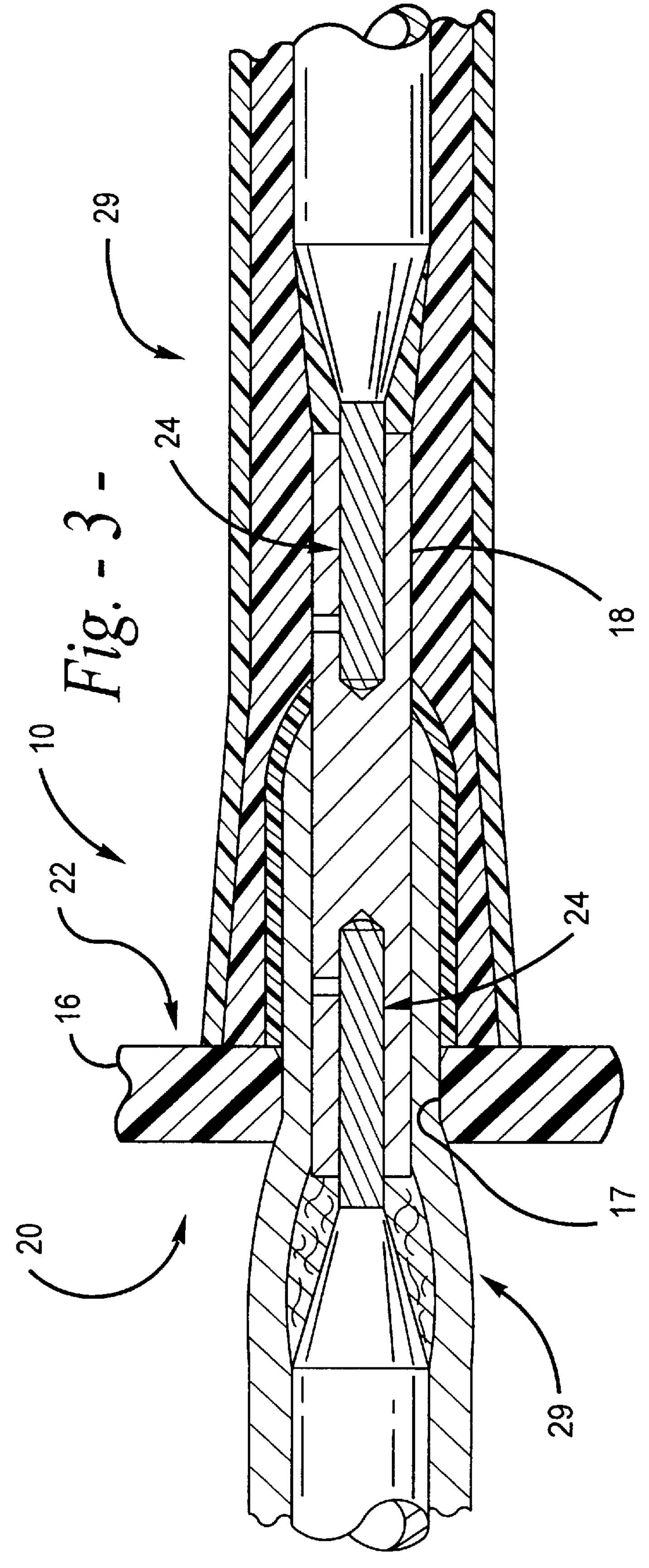
FIG. 3 is a cross sectional view of the apparatus of FIG. 2.

FIG. 2 illustrates a feed-through device 10 which provides a sealed electrical connection between a single inner lead wire 6 and a single outer lead wire 8. FIG. 3 is a cross-sectional view of the feed-through device 10. In FIG. 3, it can be seen that the feed-through device 10 is comprised of a feed-through board 16 having a bore 17 formed therethrough, a conductive rod 18 having identical connecting structures 24*a*, 24*b* formed on either end of the conductive rod 18, and a number of insulating layers formed around the inner and outer lead wires 6, 8 so as to prevent faults or short circuits in the feed-through device 10 and to create a seal between and inner side 20 and an outer side 22 of the feed-through board 16. Note that both the inner lead wire 6 and the outer lead wire 8 are generally comprised of an inner conductor or core 30 surrounded by a layer of insulating material 32. The inner conductor 30 of the lead wires 6, 8 may be of any suitable conductive material e.g. copper or aluminum. Likewise, the insulating material 32 may be of any suitable material such as paper, polyvinyl chloride (PVC), silicone, or the like.

The conductive rod 18 is preferably a cylinder fashioned of a conductive material such as copper or aluminum having a length of approximately 6 inches, a diameter of ¾ inch, and having formed into the ends thereof connecting structures 24*a*, 24*b*. The connecting structures 24*a*, 24*b* are arranged and constructed so as to create an electrical connection between the respective inner and outer lead wires 6, 8 through the body of the conductive rod 18. Each connecting structure 24*a*, 24*b* comprises a longitudinal bore 26 formed into an end of the conductive rod 18. The longitudinal bores are in this preferred embodiment approximately 2 inches deep and 23/64ths of an inch in diameter. In order to secure the conductors 30 of each of the lead wires 6, 8 within the longitudinal bores 26, each of the connecting structures 24*a*, 24*b* also includes a solder aperture 28 formed through the side wall of the conductive rod 18 so as to communicate with the longitudinal bores 26 near their respective bottoms. In this preferred embodiment the solder aperture 28 are approximately 3/16 inch in diameter and are drilled through the side wall of the conductive rod 18 approximately 1–½ inches from the ends of the rod 18. It should be understood that the specific dimensions disclosed herein are made by way of example only and should not be construed as a limitation on the scope of this invention.

Figure 4A:
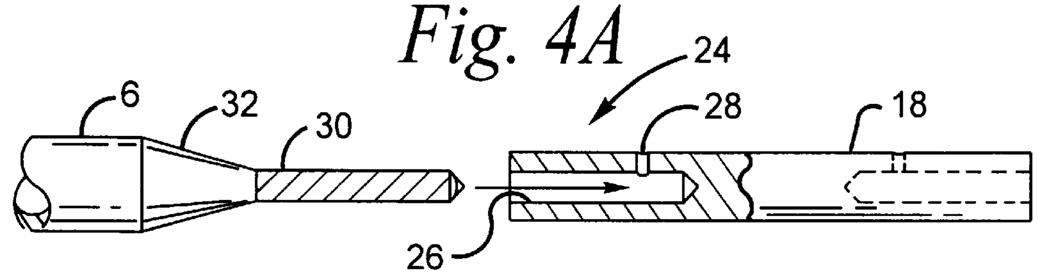
FIGS. 4A–4D illustrate the fabrication of the inner electrical connection of the lead wire feed-through device.
Figure 4B:
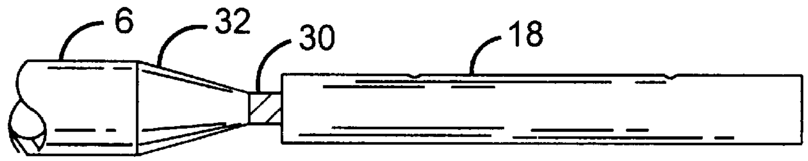
Figure 4C:
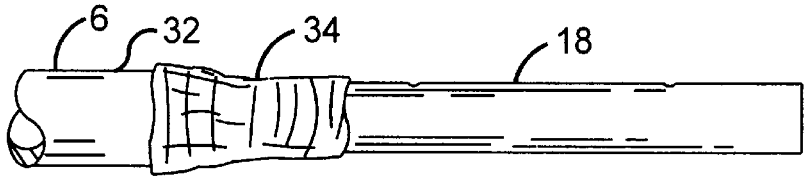

Inner lead wire 6 is connected at its first end to a junction of a number of coil leads 4, otherwise known as a lead connect (not shown). The insulating material 32 of the lead wire 6 is stripped and penciled (i.e. tapered) to expose approximately 2–¼ inches of the inner conductor 30. The inner conductor or conductor core 30 is inserted into a longitudinal bore 26 of the conductive rod 18. A suitable high temperature solder, such as a 40/60 solder is then introduced into the solder aperture 28 of the conductive rod 18 in order to secure the conductor 30 within the bore 26 and also to enhance the electrical connection therebetween. FIG. 4B illustrates the inner lead wire 6 as it is secured within the longitudinal bore 26 of the conductive rod 18. Once the inner lead wire 6 has been secured within the conductive rod 18, a portion of insulated felt 34 is wrapped around the approximately ¼ inch of bare conductor 30 and around the portions of the inner lead wire 6 and conductive rod 18 immediately adjacent to the bare conductor 30. It is preferred that the insulative felt 34 be applied to the bare conductor 30, the conductive rod 18 and inner lead wire 6 so as to smooth or level the juncture therebetween. One suitable type of insulative felt 34 is a felt made of Dacron. FIG. 4C illustrates how the insulative felt 34 should be applied to the juncture between the inner lead wire 6 and the conductive rod 18.

Once the insulative felt 34 has been applied, an insulative fiber tape 36 is wrapped about the juncture of the conductive rod 18 and the inner lead wire 6. The fiber tape 36 is preferably applied by starting at approximately 2 inches from the free end of the conductive rod 18 near the connecting structure 24*b* and working back to approximately 6 inches beyond the juncture of the inner lead wire 6 and the conductive rod 18. It is preferred that 10 half-lapped layers of the insulative fiber tape 36 be applied over the juncture between the inner lead wire 6 and the conductive rod 18, through more or fewer layers of the insulated fiber tape 36 may be added to meet the demands of a particular application. Furthermore, it is preferred that the fiber tape 36 be applied to the conductive rod 18 such that a taper 38 is formed in the insulative fiber tape 36 at its terminus upon the conductive rod 18.

Figure 4D:
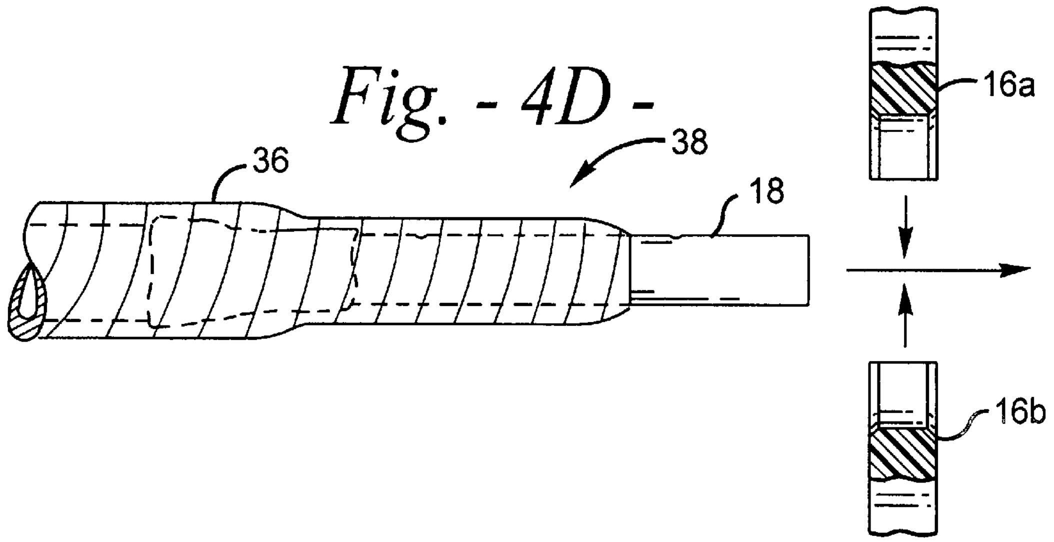
Figure 4E:
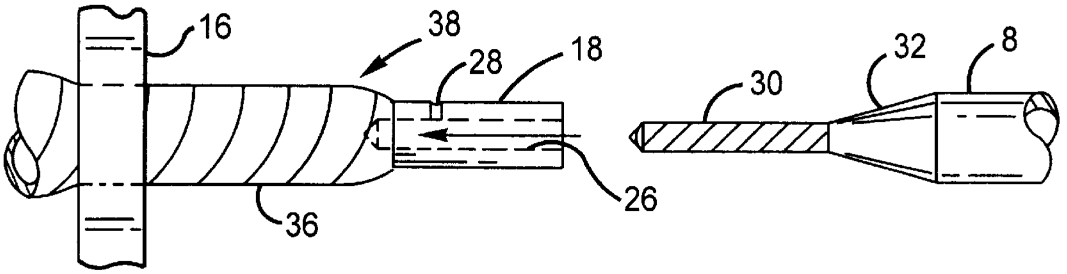
FIGS. 4E–4H illustrate the fabrication of the outer electrical connection of the lead wire feed-through device.
Figure 4F:
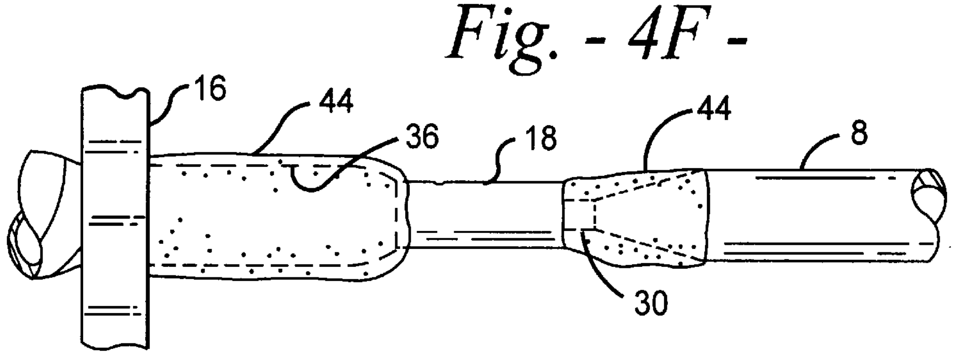

The insulative fiber tape 36 is applied over the conductive rod 18 to a diameter that is substantially the same size or slightly greater than the diameter of the bore 17 formed through the feed-through board 16. The insulative fiber tape 36 is applied over the inner lead wire 6 to a diameter that is greater than the diameter of the bore 17. In order to form a tight seal between the feed-through board 16 and the insulative fiber tape 36 wound about the conductive rod 18, it is preferred to cut the feed-through board 16 into at least two sections 16A, 16B. The sections are formed by making a cut that intersects the bore 17. Where more than one electrical connection is being made through the feed-through device 10, the feed-through board 16 may be cut into more than two sections, the additional cuts intersecting the additional bores 17. Preferably, the arrangement of multiple bores 17 in the feed-through board 16 will be optimized to minimize the number of cuts required to seat the respective lead wires within the bores 17. Sections 16A, 16B of feed-through board 16 are then pressed into place around the insulative fiber tape 36 so that bore 17 is brought into contact with the fiber tape 36 and secured in this position. See FIGS. 3 and 4D. At this point, the entire core 13, including the coils 2, the coil leads 4, the inner lead wires 6, and the feed-through board 16 associated with the inner lead wires 6, are subjected to a vacuum pressure impregnation process. Specifically, the insulated fiber tape 36 and insulative felt 34 are entirely impregnated by the epoxy resin. Once the core 13 has been entirely vacuum pressure impregnated, the epoxy resin is cured by heating the stator frame 14, in which the core 13 is mounted, in an oven. During this curing process, the epoxy resin that has impregnated the insulative fiber tape 36 wound about the juncture between the conductive rod 18 and the inner lead wire 6 is hardened to form a substantially rigid insulative layer over the juncture between the inner lead wire and the conductive rod. Furthermore, the heat of the curing cycle fuses the respective sections of the feed-through board into a single feed-through board 16 and also fuses the feed-through board 16 into the aperture in the stator frame 14 in which it is mounted. The feed-through board 16 of the feed-through device 10 is mounted within and fused to the aperture in the stator frame 14 so that a water and air tight seal is formed around the edges of the feed-through board 16. Preferably, the feed-through board 16 will be manufactured of a material such as a GPO-3 Glastic board. At this point, the outer lead wires may be attached to the connecting structure 24*b* of conductive rod 18 protruding from the feed-through board 16.

To make the connection between the conductive rod 18 and the outer lead wire 8, it is first necessary to remove any cured epoxy resin that may have collected within the longitudinal bore 26 and solder aperture 28 of the connecting structure 24*b*. Next, the insulating material 32 is removed from the outer lead wire 8 and pencilled to expose approximately 2 ¼ inches of the inner conductor 30 of the outer lead wire 8. The-exposed conductor 30 is inserted into the longitudinal bore 26 of the connecting structure 24*b*. A low temperature solder is then introduced into the solder aperture 28 to secure the conductor 30 of the outer lead wire 8 within the longitudinal bore 26 and to enhance the electrical connection between the conductive rod 18 and the outer lead wire 8.

In one embodiment of the present invention (not illustrated), the exposed conductor 30 at the juncture between the conductive rod 18 and the outer lead wire 8 is covered with an insulative tape that is preferably a silicone tape having a thickness of approximately 20 mils. However, the specific material that makes up the insulative tape and the dimensions of the tape may be changed to suit a particular application without exceeding the scope of the present invention. The insulative tape is wrapped around the exposed conductor 30 of outer lead wire 8 to level the juncture between the conductive rod 18 and the lead wire 8 and also around the cured insulative fiber tape 36 such that the point of contact between the bore 17 of the feed-through board 16 and the cured insulative fiber tape 36 is effectively sealed. The insulative tape is then wrapped about the entire outer side 22 of the feed through device 10, covering the conductive rod 18 and a portion of the insulating material 32 of the outer lead wire 8. The insulative tape is preferably applied in a half-lapped pattern to the same diameter as the cured insulated fiber tape 36 plus four additional half-lapped layers. Finally, a sleeve 48 is placed entirely over the insulative tape covering the outer side of the feed-through device 10, such that a first end of the sleeve 48 is in contact with the feed-through board 16 and a second end of the sleeve 48 is in contact with the insulative material 32 of the outer lead wire 8. The sleeve 48 is preferably a cold shrink sleeving which may be caused to shrink around the layer of insulative tape without the application of heat. One type of sleeving which is suitable for use as a sleeve 48 with the present invention, is a product manufactured by the 3M Corporation of St. Paul, Minn. having an inner sleeve of removable plastic substrate (not shown), which may be removed from within the outer sleeve 48 after the sleeve 48 has been positioned in its desired location. Once the inner substrate has been removed, the sleeve 48 contracts securely around the insulative tape.

Figure 4G:
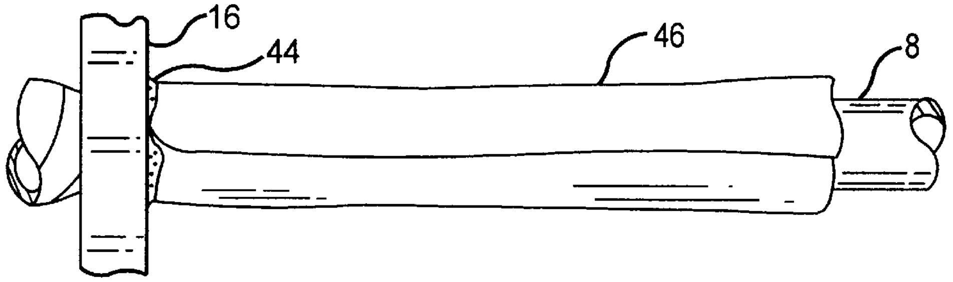
Figure 4H:
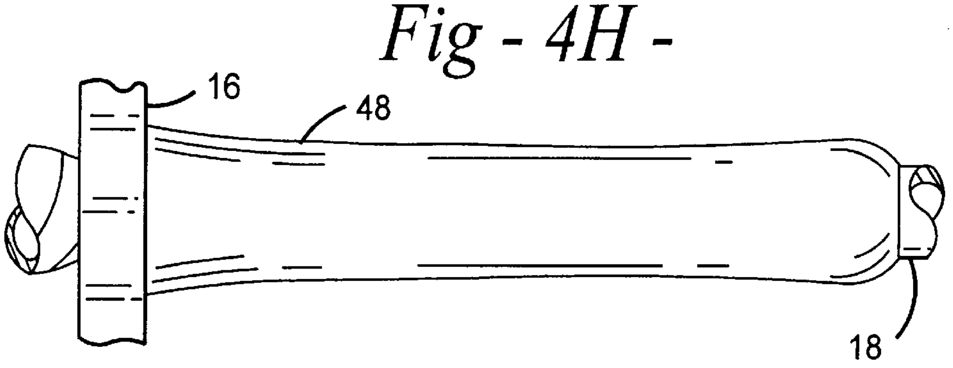
Figure 5:
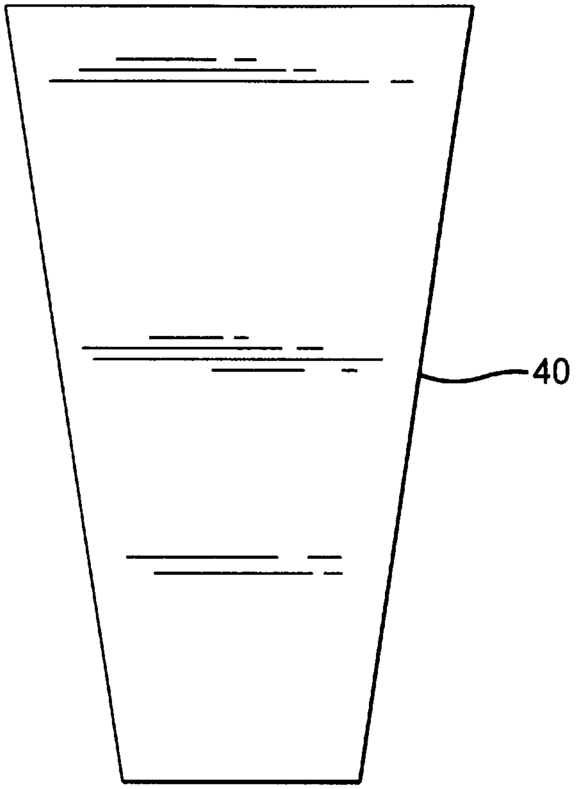
FIG. 5 depicts a trapezoidal sheet of insulating material used to insulate the exterior electrical connection of the present invention.
Figure 6:
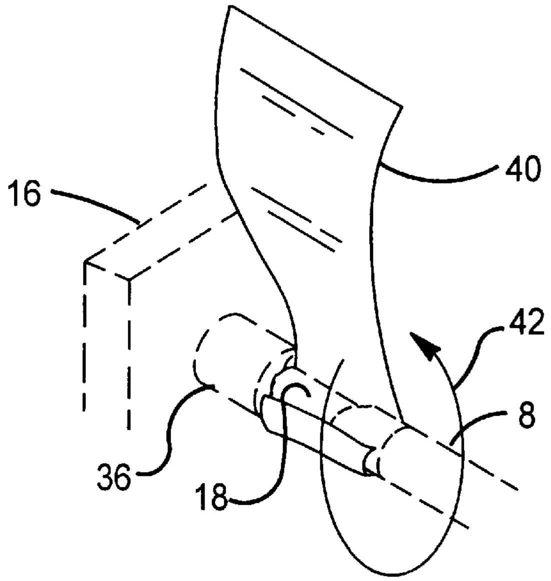
FIG. 6 illustrates the application of the insulating sheet of FIG. 5 to the lead wire feed-through device.

A preferred method of insulating the electrical connection on the outer side 22 of the feed through device 10 is illustrated in FIGS. 4E–4H and 6. An insulative mastic 44 is applied over the exposed conductor 30 of the outer lead wire 8 and over the exposed conductive rod 18 so as to level the juncture therebetween. The insulative mastic 44 is of a silicone material and is supplied as a pliable pad that is applied in much the same manner as the insulative tape. The insulative mastic 44 also applied over the cured fiber tape 36 and up to the feed-through board 16. The insulative mastic 44 effectively seals the bore 17 around the fiber tape 36 and also creates a bonding surface for the insulative sheet 46. The insulative sheet 40 is applied over the insulative mastic 46 by placing the narrower end of the trapezoidal sheet 40 over the juncture between the conductive rod 18 and the outer lead wire 8 and by wrapping the remaining portion of the sheet 40 in the manner indicated in FIG. 6 by arrow 42. Once applied, the insulative sheet 40 extends from the feed-through board 16 to the insulating material 32 of outer lead wire 8 as illustrated in FIG. 4G. Finally, a sleeve 48 is applied over the insulative sheet 40 in the same manner as described above in conjunction with FIG. 4H.

A preferred method for making a connection between an inner lead wire 6 and an outer lead wire 8 through a barrier begins with the step of connecting the inner conductor 30 of the inner lead wire 6 to a connecting structure 24*a* on a conductive rod 18. The juncture between the inner conductor 30 of the inner lead wire 6 and the conductive rod 18 is insulated with an insulative felt 34. Next, an insulative fiber tape 36 is wrapped over the insulative felt 34 an a portion of the inner lead wire 6 and a portion of the conductive rod 18. The conductive rod 18 having the insulative fiber tape 36 wrapped there around, is then secured within a bore 17 formed into a feed-through board 16. It is preferred to section the feed-through board 16 through the bore 17 and to secure the conductive rod 18, having the insulative fiber tape 36 wrapped therearound, within the bore 17 by sandwiching the conductive rod 18 between the sections 16A, 16B of the feed-through board 16.

The inner lead wire 6, the conductive rod 18, and the feed-through board 16, as well as the insulative tape 36 and the insulative felt 34, are subjected to a vacuum pressure impregnation process during which the insulative felt 34 and the insulative tape 36 are impregnated with a epoxy resin and cured to form a substantially rigid insulating layer. Furthermore, where the feed-through board 16 has been sectioned into sections 16A, 16B, the vacuum pressure impregnation process will bond sections 16A, 16B into a single feed-through board 16.

Once the vacuum pressure impregnation process has been completed, the inner conductor 30 of the outer lead wire 8 is connected to the connecting structure 24*b* projecting through the outer side 22 of feed-through board 16. It may first be necessary to remove any cured epoxy resins which may have be blocking the longitudinal bore 26 or solder aperture 28 which make up the connecting structure 24*b*. The point of connection between the outer lead wire 8 and the conducting rod 18, specifically the bare inner conductor 30 of the outer lead wire 8, is insulated with an insulative mastic 46 which is wrapped about the point of connection between the connective rod 18 and the outer lead wire 8 so as to level the gap therebetween. The insulative mastic 46 is also wrapped over the conductive rod 18 and the cured insulative fiber tape 36 to create a single layer over the outer side 22 of the feed through device 10 and to seal bore 17 in the feed-through board 16 around the circumference of the cured insulative fiber tape 36. An insulative sheet 40 is then wrapped about the layer of insulative mastic 46, the insulative sheet 40 extending from the feed-through board 16 to the insulative material 32 of the outer lead wire 8. The entire outer side 22 of the feed-through device 10 is then covered with a sleeve 48 to seal the connection between the conductive rod 18 and the outer lead wire 8.

Alternatively, the juncture between the outer lead wire 8 and the connective rod 18 may be insulated with an insulative tape which is wrapped about the exposed inner conductor 30 of the outer lead wire 8, the conductive rod 18, and a portion of the insulating material 32 of the outer lead wire 8. The insulative tape is wrapped about the outer side 22 of the feed-through device 10 to substantially the same diameter as the fiber tape 36 plus approximately four more layers. In this alternate method of insulating the connection between the outer lead wire 8 and the conductive rod 18, the bore 17 is sealed about the circumference of the cured insulative fiber tape 36 by the insulative tape. The insulative tape is then covered with a sleeve 48 in the same manner as described above.

While the preferred embodiments of the present invention have been described, it should be understood that various changes, adaptations, and modifications may be made therein without departing from the spirit of the invention and the scope of the appended claims.

We claim:

1. An electrical connection between a first conductor and a second conductor through a barrier having an inner side and an outer side,. the first and second conductors comprised of a conducting core surrounded by an insulating material, comprising:

- a feed-through board sealingly mounted in an aperture in the barrier, the feed-through board having a bore formed therethrough;
- a conductive rod disposed within the bore formed in the feed-through board, the ends of the conductive rod having a first and a second connecting structure formed therein, respectively;
- the conducting core of the first conductor being coupled to the conductive rod by means of the first connecting structure, the first conductor being located entirely on the inner side of the barrier;
- the conducting core of the second conductor being coupled to the conductive rod by means of the second connecting structure, the second conductor being located entirely on the outer side of the barrier; and,
- a plurality of insulating layers formed about the first and second conductors and the conductive rod, at least a portion of the plurality of insulating layers extending through the bore in the feed-through board to seal the bore.

2. The electrical connection between a first conductor and a second conductor through a barrier of claim 1 wherein the connecting structures of the conductive rod further comprise:

a longitudinal bore formed into each of the ends of the conductive rod, the longitudinal bores sized to receive a predetermined length of a conducting core of a conductor, and a solder aperture formed into the side wall of each of the ends of the conductive rod, the solder apertures each communicating with the respective longitudinal bores of the conductive rod.

3. The electrical connection between a first conductor and a second conductor through a barrier of claim 2 wherein the conducting cores of the first and second conductors are retained in the respective longitudinal bores in the conductive rod by a quantity of solder introduced into the respective solder apertures when the respective conductor cores are received in the respective longitudinal bores.

4. The electrical connection between a first conductor and a second conductor through a barrier of claim 1 wherein the plurality of insulating layers comprise:

an insulative felt wrapped about a juncture between the first connecting structure and the conducting core of the first conductor; an insulative fiber tape wrapped about the insulating material of the first conductor, the insulative felt, and a portion of the conductive rod, the insulative fiber tape extending through the bore in the feed-through board so as to substantially seal the bore;

an insulative mastic applied over a juncture between the second connecting structure and the conducting core of the second conductor and over the portion of the insulative fiber tape extending through the bore in the feed-through bore;

an insulative sheet wrapped about the insulative mastic applied over the juncture between the second connecting structure and the conducting core of the second conductor and over the portion of the insulative fiber tape extending through the bore in the feed-through bore; and, a sleeve applied over the insulative sheet, the sleeve extending from the outer side of the feed-through board to the insulating material of the second conductor.

5. The electrical connection between a first conductor and a second conductor through a barrier of claim 1 wherein the plurality of insulating layers comprise:

an insulative felt wrapped about the juncture of the first connecting structure and the conducting core of the first conductor;

an insulative fiber tape wrapped about the insulating material of the first conductor, the insulative felt, and a portion of the conductive rod, the insulative fiber tape extending through the bore in the feed-through board to the outer side of the board so as to substantially seal the bore;

an insulative tape wound about the conductive rod and the second conductor, the insulative tape extending continuously from the outer side of the feed-through board to the insulating material of the second conductor; and a sleeve applied over the insulative tape, the sleeve extending from the feed-through board to the insulating material of the second conductor.

6. The electrical connection of claim 4 wherein at least 10 layers of the insulative fiber tape are wrapped about the first conductor, the insulative felt, and the portion of the conductive rod.

7. The electrical connection of tape of claim 5 wherein at least 10 layers of the insulative fiber tape are wrapped about the first conductor, the insulative felt, and the portion of the conductive rod.

8. The electrical connection of claim 4 wherein the insulative fiber tape is comprised of fibers of mica.

9. The electrical connection of claim 5 wherein the insulative fiber tape is comprised of fibers of mica.

10. The electrical connection of claim 4 wherein the insulative sheet comprises a tapered trapezoidal sheet of silicone insulating material, the sheet having a narrow end and a wide end, the narrow end of the sheet being wrapped around a juncture between the conductive rod and the second conductor, each successive turn of the sheet around the first conductor extending longitudinally farther along the conductive rod and the insulating material of the first conductor than the previous turn.

11. The electrical connection of claim 1 wherein the feed-through board comprises a plurality of bores.

12. The electrical connection of claim 1 wherein the feed-through board is comprised of two sections, the sections being delineated by an edge that intersects the bore formed in the feed-through board such that a conductive rod having the first and second conductors coupled thereto may captured in the bore between the two sections as the sections are brought together to form a unitary feed-through board.

13. The electrical connection of claim 11 wherein the feed-through board comprises a plurality of sections, the sections being delineated by a plurality of edges that intersect the plurality of bores formed in the feed-through board such that a plurality of conductive rods having respective first and second conductors coupled thereto may be captured in the bores between the sections as the sections are brought together to form a unitary feed-through board.

14. A method for making an electrical connection between a first conductor and a second conductor through a barrier having an inner side and an outer side, the first and second conductors comprised of a conducting core surrounded by an insulating material, the method comprising the steps of:

connecting the first conductor to a first end of a conductive rod;

wrapping a juncture between the first conductor and the first end of the conductive rod in a first insulative material;

wrapping a second insulative material around the electrical connection on the inner side of the barrier over a portion of the insulating material of the first conductor, a portion of the conductive rod, and the first insulative material that is wrapped about the juncture between the first conductor and the first end of the conductive rod;

securing the wrapped conductive rod in a bore in a feed-through board;

impregnating the first and second insulative materials with an epoxy resin;

curing the epoxy resin;

connecting the second conductor to a second end of a conductive rod;

wrapping continuously the electrical connection on the outer side of the barrier with a third insulative material;

wrapping a fourth insulative material over the third insulative material, the fourth insulative material extending from the feed-through board to the second conductor; and, securing over the fourth insulative material a sleeve, the sleeve extending from the outer side of the feed-through board to the insulating material of the second conductor.

15. The method for making an electrical connection of claim 14 wherein the first insulative material is an insulative felt material.

16. The method for making an electrical connection of claim 14 wherein the second insulative material is an insulative fiber tape.

17. The method for making an electrical connection of claim 14 wherein the third insulative material is an insulative mastic.

18. The method for making an electrical connection of claim 14 wherein the fourth insulative material is an insulative sheet.

19. An electrical connection between a first conductor and a second conductor through a barrier having an inner side and an outer side, the first and second conductors comprised of a conducting core surrounded by an insulating material, the apparatus comprising:

a feed-through board sealingly mounted in an aperture in the barrier, the feed-through board having a bore formed therethrough;

a conductive rod disposed within the bore formed in the feed-through board, each of the ends of the conductive rod including a longitudinal bore formed therein and sized to receive a predetermined length of a conducting core of a conductor, each of the longitudinal bores having associated therewith a solder aperture formed into the side wall of the conductive rod and communicating with the respective longitudinal bores of the conductive rod;

the conducting core of the first conductor being coupled to the conductive rod by means of a first longitudinal bore, the first conductor being located entirely on the inner side of the barrier;

the conducting core of the second conductor being coupled to the conductive rod by means of a second connecting structure, the second conductor being located entirely on the outer side of the barrier; and, a plurality of insulating layers formed about the first and second conductors and the conductive rod, at least a portion of the insulating layers extending through the bore in the feed-through board to seal the bore.

20. An electrical connection between a first conductor and a second conductor through a barrier having an inner side and an outer side, the first and second conductors comprised of a conducting core surrounded by an insulating material, the apparatus comprising:

a feed-through board sealingly mounted in an aperture in the barrier, the feed-through board having a bore formed therethrough;

a conductive rod disposed within the bore formed in the feed-through board, each of the ends of the conductive rod including a longitudinal bore formed therein and sized to receive a predetermined length of a conducting core of a conductor, each of the longitudinal bores having associated therewith a solder aperture formed into the side wall of the conductive rod and communicating with the respective longitudinal bores of the conductive rod;

the conducting core of the first conductor being coupled to the conductive rod by means of the first longitudinal bore, the first conductor being located on the inner side of the barrier, the conducting core of the first conductor being secured within the first longitudinal bore by a quantity of solder introduced into the solder aperture associated with the first longitudinal bore;

the conducting core of the second conductor being coupled to the conductive rod by means of the second longitudinal bore, the second conductor being located on the outer side of the barrier, the conducting core of the second conductor being secured within the second longitudinal bore by a quantity of solder introduced into the solder aperture associated with the second longitudinal bore; and, a plurality of insulating layers formed about the first and second conductors and the conductive rod, the insulating layers comprising:

an insulative felt wrapped about a juncture between the conductive rod and the conducting core of the first conductor;

an insulative fiber tape wrapped about the insulating material of the first conductor, the insulative felt, and a portion of the conductive rod, the insulative fiber tape extending through the bore in the feed-through board to the outer side of the board so as to substantially seal the bore;

an insulative mastic wrapped about the electrical connection on the outer side of the barrier;

an insulative sheet wrapped about the insulative mastic, the insulative sheet extending from the feed-through board to the insulating material of the second conductor; and, a sleeve applied over the insulative sheet and extending from the feed-through board to the insulating material of the second conductor.

* * * * *